United States Patent Office 3,423,411
Patented Jan. 21, 1969

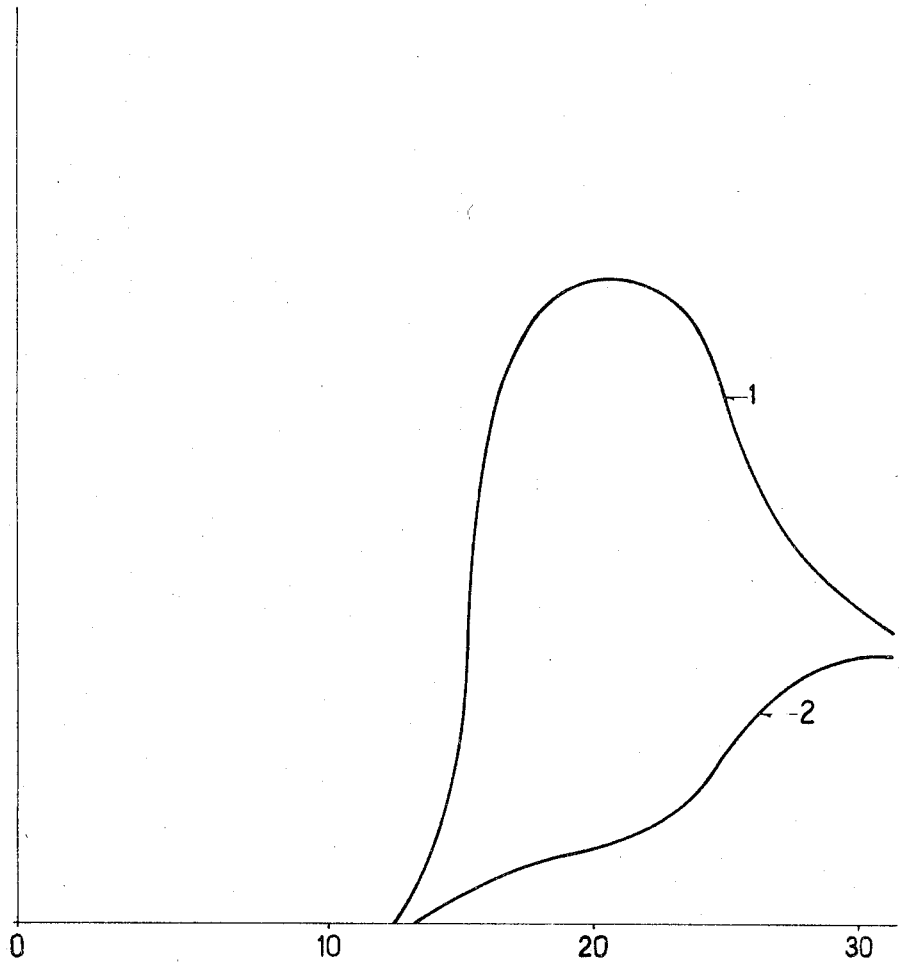

3,423,411
PURIFICATION OF MELAMINE SOLUTIONS
Ibrahim Dakli, Busto Arsizio, Pietro Ercole, Legnano, and Franco Jacobelli, Busto Arsizio, Italy, assignors to Montecatini Edison S.p.A., Milan, Italy
Filed Oct. 18, 1966, Ser. No. 587,473
Claims priority, application Italy, Oct. 22, 1965, 23,716/65
U.S. Cl. 260—249.7                  6 Claims
Int. Cl. C07d 55/24

Our invention relates to a new process for the purification of melamine solutions. More particularly, the invention relates to the purification of mother liquors from the crystallization of raw melamine. The process herein described allows an effective purification together with quantitative recovery of melamine.

It is known that in order to obtain a high purity product suitable for the preparation of synthetic resins, it is necessary to purify raw melamine. When the purification is by crystallization, the residual mother liquors are further purified to recover melamine. However, the purification of melamine solutions, either coming directly from the synthesis or being the residues of the crystallization of the former, is particularly difficult when the quantitative recovery of the product is desired.

These solutions contain low concentrations of many substances which have similar structure and chemical behavior. The melamine solutions coming either from the synthesis or from the crystallization stage qualitatively have the same composition. The solutions contain melamine (at a higher concentration if the product has still to be crystallized), oxy- and oxyamino-triazines as alkali salts, ammonium carbonates and hydrates, sodium or other alkali metals, nitrogen containing impurities consisting of unreacted or partially reacted products such as urea and biuret, etc. or of melamine condensation products, such as melam, melem, etc.

The invention has as an object the purification of these solutions by separation of each of these compounds or classes of melamine compounds in such a way that they can be profitably reemployed without losses of melamine while simultaneously avoiding effluent solutions containing high amounts of organic substances which could pollute the effluent waters. A further object is a simple process using only small amounts of reactants and/or power in order that the process is economically feasible.

According to the process of the present invention one proceeds as follows:

The solutions of raw melamine or the mother liquor coming from the crystallization of melamine are introduced into a reactor in which they are treated with $CO_2$ until the previously alkaline pH turns neutral or only slightly alkaline. As a consequent of this treatment, the alkali carbonates and hydrates are transformed into the corresponding bicarbonates and the oxy- and oxyamino-triazines are shifted from their salts and are precipitated. The suspension coming from the $CO_2$ treatment is filtered thus recovering the oxy- and oxyamino-triazines which can be employed for many useful purposes. The solution thus obtained is then introduced into a column filled with a cationic exchange resin and is percolated through it until the column is exhausted. This is apparent when the solution leaving the column has the same composition as the feed solution.

During the percolation, the following phenomena take place:

The resin first absorbs the alkali ions and melamine so that the solution leaving the column contains only the nitrogen containing impurities such as urea and biuret and small amounts of oxyamino-triazines. The other nitrogen containing impurities consisting of melamine condensation products, because of the hydrolytic action exerted by the acid groups of the resin, are transformed into melamine, which is captured by the exchange resins, and into oxyamino-triazines which are not captured. The solution, which is collected in this first stage of the process, because of its composition, may be discharged or reused in the same plant producing melamine or in a plant producing urea, depending on the process used. Continuing with the circulation of the initial solution through the resin containing column, the alkali ions (sodium, ammonium, etc.) will displace the melamine from the acid groups of the resin. Thus a solution will be obtained containing for the most part melamine (in a concentration much higher than that fed) together with small amounts of alkali ions. This solution leaving the column may either be crystallized thus obtaining a product having a high purity or, especially when it consists of mother liquors, it may be recycled to the crystallization stage.

The feed solution must be stopped as soon as the solution leaving the column has approximately the same composition as the feed solution. At this stage, the column which is completely saturated with sodium ions must be regenerated. This is accomplished by using dilute sulfuric acid according to conventional technique to produce a solution of sodium sulfate which is discharged or used in other processes.

The advantages achieved by the present invention are evident when one considers that the purification is obtained by completely recovering melamine while using low-cost reactants. One may operate within wide limits, without departing from the process hereinbefore described. Thus, the composition of the solutions which are fed to the purification may widely vary depending on whether the solutions are raw melamine solutions or mother liquors of crystallization. In the latter case they further vary according to the purity of the melamine which undergoes crystallization and to the amount of the recycle of the mother liquors. One may therefore have in the solutions to be purified either a prevailing amount of melamine (as commonly occurs) or a prevailing amount of alkaline salts of oxy- and oxyamino-triazines. The concentration of the alkaline ions may also vary. The amount of alkaline ions will increase with increasing amounts of the oxy- and oxyamino-triazinic impurities. In the latter case, it is convenient to carry out the treatment with ion exchange in a plurality of columns instead of in a single column as hereinbefore described. The temperature at which the precipitation and the subsequent filtration are carried out is a function of the melamine content of the solution to be purified, in order to avoid melamine losses during the separation of the oxy- and oxyamino-triazines. Under the operating conditions, temperatures of between 15 and 100° C. are most commonly used. The temperature at which the exchange resins treatment is carried out may be, preferably, equal to or higher than that at which the $CO_2$ treatment is carried out and, in order to avoid dangerous precipitations on the resin, is a function of the maximum melamine concentration in the outlet solutions. The inlet melamine concentration is regulated so that the exchange resins are kept at a not too high temperature thereby securing a long working life to the resins. The content of dry materials of the solutions may vary over wide limits, from a fraction of a percent to several percent. The purification of solutions having a high content of dry materials is however possible according to the present invention.

The exchange resins suitable for the treatment are those of acid type, particularly those of strong acid type having sulfonic groups in the resin body.

FIG. 1 shows the ratios of concentration of various ions at the inlet and outlet of the ion exchange resin column.

The present invention is particularly suitable for use in plants producing melamine from urea. However, it may be used also in other processes producing melamine.

In order to better explain the invention, we give herewith an example of reduction to practice of the purification process according to the invention, without intending to limit the scope of the invention to said example. The amounts referred to are by weight, except those explicitly otherwise identified.

Example 2500 l. of mother liquors coming from the melamine crystallization at 35° C. and having the following percent composition:

| | |
|---|---|
| Sodium salts of oxy- and oxyamino-triazines | 0.31 |
| Melamine | 0.70 |
| Sodium hydroxide | 0.15 |
| Sodium carbonate | 0.2 |
| Other nitrogen containing impurities | 0.09 |
| Water | 98.55 | are fed into a 4000 l. autoclave kept at 40° C., into which $CO_2$ is fed through a bubbler, while conveniently stirring the mass, until the pH drops from 12.2 to 7.2. The turbid mass obtained by precipitating the oxy- and oxyaminotriazines is filtered at 40° C., thus recovering 85% of the oxytriazinic derivatives fed as sodium salts.

The filtrate containing, in addition to water and $CO_2$, the following substances

| | |
|---|---|
| Oxy- and oxyamino-triazines | 0.04 |
| Melamine | 0.7 |
| $Na^+$ | 0.23 |
| Other nitrogen containing impurities | 0.09 | is fed into a column kept at 60° C. and filled with the cationic exchange resin, under hydrogen form, Kastel C 300 (trademark of a product sold by Montecatini) having the following dimensions:

| | Mm. |
|---|---|
| Internal diameter | 180 |
| Height | 3500 |
| Height of the resin layer | 3100 |

Resin volume, about 82 l.

The solution to be treated is percolated through the column at the rate of 5 volumes of solution per volume of exchange resin per hour. Samples are taken of the solution at the outlet for each volume collected and are analyzed. The percolation operation is continued until 30 volumes of solution per volume of resin are percolated. At this stage, the analysis reveals that the compositions of the solutions at the inlet and at the outlet are about the same and the feeding of the solution into the column is stopped. The resin is now completely in sodium form and must be regenerated. FIG. 1 reports the ratios as ordinates, between the melamine concentrations (line 1) and the concentrations of the sodium ions (line 2) of the solutions, at the inlet and outlet of the ion exchanger, as a function of the volumes of solution treated (per exchanger volume) reported as abscissae.

One sees that melamine leaves the column almost completely (with an average concentration higher than that at the inlet) starting from the 12th volume fed. At the same time, one sees that the sodium ions in the zone wherein melamine is concentrated come out with a concentration which is lower than that of the solution at the inlet.

Because of the analysis of the solutions and the examination of the curve of FIG. 1, the outlet solutions from the 1st to the 11th volume (fraction A), from the 12th to the 26th volume (fraction B) and from the 27th to the 30th volume (fraction C) are collected. The percentage of the various substances in the three fractions is shown in the table hereinbelow.

PERCENT CONTENT OF THE VARIOUS SUBSTANCES IN THE SOLUTIONS LEAVING THE TREATMENT WITH EXCHANGE RESINS

| Solution | Melamine | Oxy- and oxyaminotriazines | $Na^+$ (°) | Other nitrogen containing impurities (urea, biuret, etc.) |
|---|---|---|---|---|
| Fraction A | | 0.0008 | | 0.09 |
| Fraction B | 1.14 | 0.08 | 0.07 | 0.09 |
| Fraction C | 0.96 | | 0.27 | 0.09 |

(°) 70% of the sodium ions is fixed by the active groups of the resin

Fraction A is recycled to a urea plant; fraction B is recycled to the crystallization stage of the melamine plant, while fraction C is recycled to the treatment with the ion exchange resin. The mother liquors still contained are then eluted from the column with water, the column is washed and then regenerated by introducing, at 20° C., a 10% solution of sulfuric acid in an amount of 1600 g. of solution per liter of exchange resin. The column is then thoroughly washed with deionized water until the wash waters no longer give an acid reaction. The washing and regeneration solutions are then discharged while the mother liquors shifted (eluted) with water are again fed to the treatment with the exchange resin.

We claim:
1. A process for the purification of melamine solutions, which comprises treating the melamine containing solution with $CO_2$ in order to precipitate the oxy- and oxyaminotriazines, filtering off the solids and percolating the filtrate through a column filled with a cationic exchange resin whereby melamine is separated from the other nitrogen containing organic impurities and from the alkali ions.

2. The process of claim 1, wherein melamine is directly recovered through crystallization from the melamine containing solution leaving the exchange resins.

3. The process according to claim 1, wherein the melamine solution obtained by the treatment with exchange resins is recycled to the crystallization stage of a melamine production plant.

4. The process according to claim 1, wherein the melamine solution to be purified consists of the mother liquors deriving from the crystallization of raw melamine.

5. The process according to claim 4, wherein the treatment is continuously carried out.

6. The process according to claim 4, wherein the oxy- and oxyaminotriazines are also recovered.

References Cited

UNITED STATES PATENTS 3,161,638  12/1964  Christoffel et al.  260—249.7
3,172,887  3/1965  Bondi  260—249.7

HENRY R. JILES, Primary Examiner.

J. M. FORD, Assistant Examiner.

U.S. Cl. X.R.

260—249.6